March 14, 1933.  M. DE HAAS ET AL  1,901,295
MILLING MACHINE
Filed Feb. 5, 1931
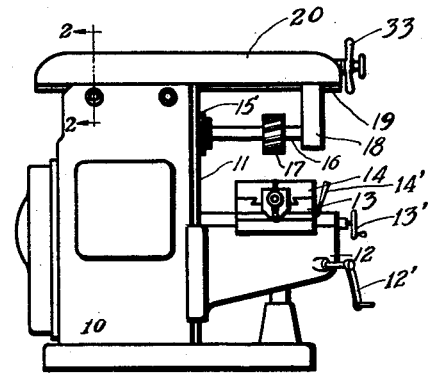
Fig. 1
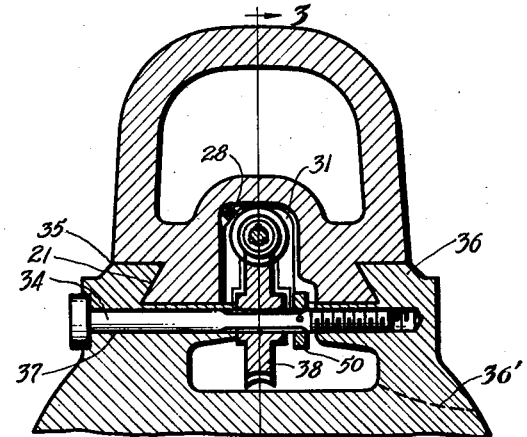
Fig. 2
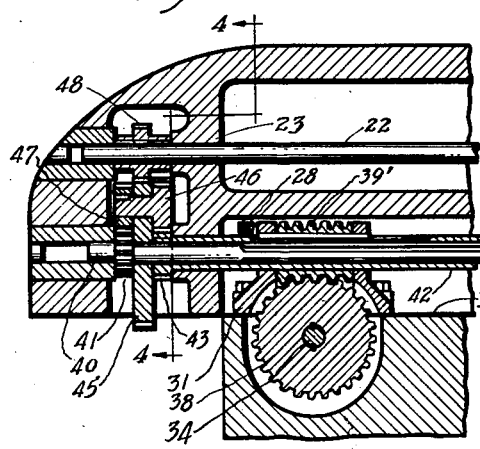
Fig. 3
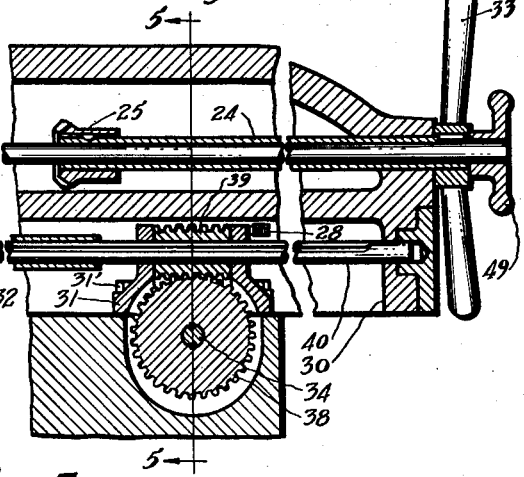
Fig. 5
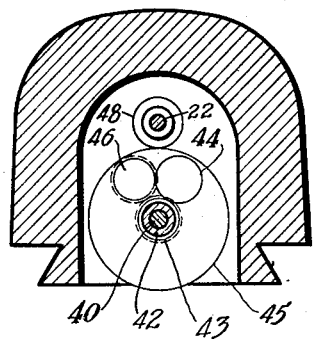
Fig. 4
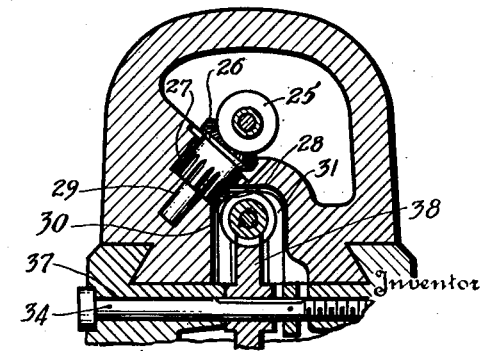
Inventor
Max De Haas
Bernard Sassen
By A.H.K. Parsons
Attorney Patented Mar. 14, 1933

1,901,295

UNITED STATES PATENT OFFICE

MAX DE HAAS AND BERNARD SASSEN, OF CINCINNATI, OHIO, ASSIGNORS TO THE CINCINNATI MILLING MACHINE COMPANY, OF CINCINNATI, OHIO, A CORPORATION OF OHIO

MILLING MACHINE

Application filed February 5, 1931. Serial No. 513,665.

This invention relates to milling machines and more particularly to improvements in overarm structures therefor.

One of the objects of this invention is to provide an improved adjustable overarm for a milling machine that may be adjusted and clamped by the attendant from his normal operating position at the machine.

Another object of this invention is the provision of improved means for clamping a milling machine overarm with equalized pressure at all clamping points thereby insuring accuracy of alignment in all positions of adjustment.

A further object of this invention is to provide a differentially operated clamping mechanism for the overarm of a milling machine.

Other objects and advantages of the present invention should be readily apparent by reference to the following specification considered in conjunction with the accompanying drawing illustrative of one embodiment thereof, but it will be understood that any modifications may be made in the specific structural details hereinafter disclosed, within the scope of the appended claims, without departing from or exceeding the spirit of the invention.

Referring to the drawing in which like reference numerals indicate like parts:

Figure 1 is an elevation of a milling machine embodying the principles of this invention.

Figure 2 is a section on the line 2—2 of Figure 1.

Figure 3 is a longitudinal section through the overarm as viewed on the line 3—3 of Figure 2.

Figure 4 is a section on the line 4—4 of Figure 3.

Figure 5 is a section on the line 5—5 of Figure 3.

In the drawing the reference numeral 10 indicates the column of a milling machine having vertical guideways 11 formed upon one face thereof for receiving a work supporting structure comprising a knee 12 adjustably mounted on the guideways 11 a saddle 13 transversely adjustable on the knee and a table 14 reciprocably mounted upon the saddle. Control levers 12', 13' and 14' are grouped at the front of the machine forming an operating or control station for determining adjustment of the respective supports. A cutter spindle 15 is journaled in the upper part of the column for the reception of a cutter arbor 16 on which is supported a cutter 17 for effecting a tooling operation upon work carried by the table 14. A pendant 18 is adjustably mounted on guideways 19 formed upon the bottom face of an overarm 20 which is slidably mounted in guideways 21 formed upon the top face of the column.

In the operation of machine tools in general and particularly in a milling machine of the type herein described it is usual practice to group the tooling operation control levers thereof at some particular advantageous point about the machine whereby the operator may observe the action of the machine during cutting and at the same time control the various movements thereof without changing his point of observation to the end that the machine may be made to produce at its maximum efficiency compatible with safety of operation. Not only is it desirable to have a suitable control station for operating the machine but it is also desirable to be able to effect set-up adjustments from the same position. Different tooling operations and different materials require particular types or sizes of cutters necessitating frequent changes thereof which also require in many instances, a shifting and adjusting of the overarm to suit the new set-up.

In prior structures adjustment and clamping of the overarm has usually been effected from some position at the rear of the machine which was inconvenient and required much moving about before effecting the new position of the overarm. These difficulties have been overcome in the present invention by providing adjusting and clamping control levers for the overarm which are operative from the end thereof and are adjacent the operator's normal position at the front of the machine.

In accordance with the foregoing objects, the overarm has been provided with a longitudinal shaft 22 which extends the full length of the overarm and is journaled at one end in a boss 23 and at the forward end in a sleeve 24. The sleeve is rotatably journaled in the overarm and has fixed to the interior end thereof a bevel gear 25 meshing with a bevel gear 26 which has integrally formed on its shank a pinion gear 27 meshing with a rack 28. The gear 26 is journaled in a bore 29 which is formed at such an angle as to intercept or break into a longitudinal groove 30 cast in the underside of the overarm. The groove 30 forms a sort of housing over a plurality of brackets 31 attached as by bolts 31' to the top of the column centrally of the overarm guide or bearing surface 32 formed therein. The rack 28 is secured to a beveled face formed on a corner of these brackets in proper alignment with the gear 27. A hand wheel 33 is keyed to the projecting end of the sleeve 24 in a position to be grasped by the operator at the front of the machine and rotatable in opposite directions to effect forward or rearward movement of the overarm.

After adjustment of the overarm means have been provided for clamping the same in position on the column comprising a plurality of bolts 34 extending transversely of the column beneath the overarm guideway. As shown in Figure 2 the guideway comprises a substantially fixed side 35 and a slightly resilient side 36 which may be made so by a plurality of saw cuts 36' in a well known manner. The bolts 34 pass through a bore 37 formed in the fixed side of the guideway and are threaded into the portion 36. A worm gear 38 is splined intermediate the length of each bolt for effecting rotation thereof.

Differential means have been provided for rotating the worm gears each of which is provided with a separate driving worm, such as 39 and 39'. The worm 39 is splined on an oscillatable shaft 40 journaled in opposite ends of the overarm and provided with a pinion 41 adjacent one of the ends. The worm 39' is splined on a sleeve 42 mounted co-axially of the shaft 40 for independent rotation with respect thereto by a pinion 43 secured to the rear end of the sleeve. It will be noted that worms 39' and 39 are mounted between fixed brackets 31 which prevent longitudinal movement, while the sleeve 42 and shaft 40, which are splined respectively therein, are capable of longitudinal movement with respect thereto. This permits axial adjustment of the overarm while still maintaining an operative connection with the clamping bolts.

As more particularly shown in Figure 4 the pinion 43 meshes with an idler pinion 44 which is journaled on a stub shaft secured to one face of a gear 45 mounted for free rotation on the shaft 40 intermediate the pinions 41 and 43. Also journaled to the gear 45 but on opposite faces thereof are the pinions 46 and 47. It will be noted from Figure 3 that these gears are integrally connected forming a couplet for simultaneous rotation. The large gear 45 meshes with a gear 48 secured to the rear end of the previously mentioned shaft 22. This shaft extends through the sleeve 24 and projects from the front of the overarm beyond the hub of the hand wheel 33 for receiving an operating knob 49 keyed to the end thereof.

Rotation of the knob 49 in a clockwise direction, as viewed from the front of the machine, will effect rotation of the gear 45 in a counter clockwise direction through the medium of gear 48. Since the gear couplet 46—47 and the idler 44 are journaled in the gear 45 they will bodily move with the gear. It will be noted that the gear 47 meshes directly with the gear 41 while the gear 46 is operatively connected with the gear 43 through the medium of the idler 44. Therefore, upon rotation of the gear 45 in a counter clockwise direction, if the clamping bolt operated by the worm 39 is tight and the bolt connected with the worm 39' is loose, the pinion 47 will rotate around the gear 41 in an epicyclic manner thereby causing rotation of the pinion 46, which through idler 44, pinion 43 and sleeve 42 will effect rotation of worm 39' and connected bolt until the resistance offered thereby is equal to the resistance of the worm 39. This will result in the pinions 41 and 43 offering an equal resistance to rotation in which case the couplet 46—47 will be locked against rotation and moved bodily as a unit with the gear 45 thereby acting as a driving key to effect simultaneous rotation of both pinions 41 and 43. In this manner both of the clamping bolts will draw the flexible side of the guideway toward the fixed side with equal pressure thereby insuring equal clamping and accurate alignment of the overarm.

Reverse rotation of the operating hand wheel or knob 49 will effect loosening of the clamping bolts. It will very frequently occur that one bolt will loosen before the other and accordingly a resistance must be supplied to the loosened bolt in order to cause the differential to effect loosening of the other bolt. To this end a collar 50 has been secured to each bolt, so that after one bolt has reversely rotated or retracted sufficiently to free the overarm, the collar secured thereto will abut the hub of its worm gear preventing further retraction and setting up a sufficient resistance to initiate reverse rotation of the other locking bolt.

It should now be apparent that an improved overarm structure has been provided for a milling machine in which the overarm may be longitudinally adjusted and evenly clamped throughout its length with respect to its supporting guideways and in which all of these adjustments may be effected from the normal operating station of the machine.

That which is claimed is:

1. In a milling machine having a column and a cutter arbor journaled therein, an overarm slidably mounted on the column for supporting the outboard end of said arbor, means for effecting longitudinal adjustment of the overarm relative to the column, mechanism for clamping the overarm to the column comprising a plurality of clamping bolts mounted in the column, rotating means mounted on said bolts, and means carried by the overarm in operative engagement with said rotating means for effecting actuation thereof and thereby clamp the overarm in any position of longitudinal adjustment.

2. In a milling machine having a column and a cutter arbor journaled therein, an overarm mounted on the column for supporting the outboard end of said arbor, means to adjust the overarm relative to the column, means to clamp the overarm to the column comprising a plurality of clamp bolts rotatably mounted in the column, worm gears splined thereon, a plurality of shafts journaled in the overarm each shaft having a worm meshing with one of said worm gears, and a differential mechanism for actuating said shafts to effect equalized clamping by all of said bolts.

3. In a milling machine having a column and an overarm adjustably mounted thereon, a plurality of clamping devices for securing the overarm to the column, a common actuator therefor, motion transmitting means including differential mechanism coupling the actuator with said devices, said actuator being movable in opposite directions to clamp or release the overarm with respect to the column, and means effective during the releasing to compensate for premature unclamping of one of said devices whereby all of the devices will be unclamped to substantially the same degree.

4. A milling machine having a column, an overarm adjustably supported by the column, a plurality of means for securing the overarm against relative movement with respect to the column, a common actuator for said means, motion transmitting connections between the actuator and said means including a differential mechanism to prevent premature clamping of one of said means upon movement of the actuator in one direction, and independent compensators coupled with each of said means to insure unclamping of all of said means to a substantially equal degree upon movement of the actuator in the opposite direction.

5. A milling machine having a column, an overarm carried by the column, a plurality of brackets secured to the column for supporting overarm clamping mechanism, means for effecting longitudinal movement of the column including a rack secured to said brackets, a pinion journaled in the overarm in engagement with said rack, operating means journaled in the overarm for effecting rotation of said pinion and thereby movement of the overarm, and independent means carried by the overarm for actuating said clamping mechanism.

6. A milling machine having a column, guideways formed on one face of the column, a work support mounted on said guideways, control levers on the side of the support opposite to the column for effecting adjustment of the work support in a plurality of directions, a cutter spindle journaled in the column, a cutter arbor mounted in the end of the spindle for rotation thereby, an overarm adjustably mounted on the top of the column for movement parallel to the axis of the cutter spindle for supporting the outboard end of said arbor, mechanism mounted in the overarm for effecting longitudinal adjustment thereof, additional mechanism for clamping the overarm to the column, and a plurality of control levers mounted on the end of the overarm and adjacent to the work support control levers for actuating said adjusting and clamping means.

7. A milling machine having a column, a cutter spindle journaled therein, a work support mounted on the column for movement transversely of the spindle, means on the side of the work support opposite to the column for determining movement of the table, an overarm slidably mounted in the top of the column parallel to the axis of the spindle, means mounted in the overarm for effecting longitudinal adjustment thereof, additional means mounted in the column for clamping the overarm to the column, and a control lever for each of said means mounted on the end of the overarm adjacent to said table control lever whereby the overarm and work support may be controlled at the side of the table opposite to the column.

8. A milling machine comprising a column, a work support mounted therein for adjustment in a plurality of directions, means at the side of the work support opposite to the column for effecting said adjustment, a cutter spindle journaled in the overarm, a cutter arbor having one end mounted in the spindle for rotation thereby, means to support the free end of said arbor including an overarm slidably mounted on the column, means carried by the overarm co-operating with a member on the column for translating the overarm, means carried by the column for clamping the overarm thereto, co-axial control levers mounted on the end of the overarm adjacent the work table control levers, said co-axial control levers being capable of independent movement, motion transmitting connections from one co-axial lever to said clamping mechanism, and independent motion transmitting means from the other co-axial lever to said adjusting mechanism whereby the overarm may be longitudinally adjusted and clamped from the table controlling station.

9. A milling machine comprising a support, a cutter spindle journaled in the support, a work table mounted adjacent the spindle for movement transversely thereof, a cutter arbor overlying the work table and having one end in operative engagement with said spindle for rotation thereby, means at the side of the work table opposite to the spindle support for controlling table actuation, an overarm adjustably mounted on the spindle support for journaling the outboard end of said cutter arbor, means for securing the overarm to the support including a plurality of clamps spaced longitudinally of the overarm and mounted in the support, a differential mechanism carried by the overarm having independent motion transmitting connections with each of said clamps to cause equal clamping pressure to be exerted thereby, and a control lever mounted on the end of the overarm on the side of the table opposite the column and adjacent the table control lever for determining actuation of said mechanism.

10. A milling machine comprising a spindle support, a cutter spindle journaled therein, a work table mounted for movement transversely of the spindle, means on the side of the work table opposite to the spindle support for determining actuation of the table, a cutter arbor attached at one end of the spindle for rotation thereby, means to support the free end of said arbor including an overarm slidably mounted in the spindle support for axial adjustment parallel to the cutter spindle, a fixed rack, a pinion journaled in the overarm in engagement with said rack, a shaft journaled in the overarm and extending longitudinally thereof, motion transmitting connections between said shaft and the pinion, and an operating member secured to the end of the shaft at the free end of the overarm which overlies the table whereby the overarm may be axially adjusted and the movement of the table controlled from a position at the side of the table opposite to the spindle support.

11. In a milling machine having a column, a movable work support mounted on the column having adjustment determining control levers grouped at a side thereof opposite to the column to form a control station, a cutter arbor journaled in the column and extending over the work support, an overarm slidably mounted in the column for movement parallel to the axis of said arbor and in over-lying relation to the work support for supporting the free end of the arbor, mechanism in the column for clamping the overarm relative thereto, a control lever adjacent said control station and extensible motion transmitting connections coupling the lever to the mechanism.

12. A milling machine comprising a spindle support, a cutter spindle journaled in the support, a work table mounted for movement transversely of the spindle, means on the side of the work table opposite to the spindle support for determining actuation of the table, a cutter arbor attached at one end to the spindle for rotation thereby, means to support the free end of said arbor including an overarm slidably mounted in the spindle support for movement parallel to the cutter spindle, rack and pinion means, one of which is mounted in the overarm for effecting adjustment thereof, a shaft journaled in the overarm and extending beyond the end thereof in overlying relation to the work support, an operating member secured to the end of the shaft, and motion transmitting means connecting the shaft to said rack and pinion means whereby rotation of the actuator will effect relative movement between the rack and pinion and thereby axial adjustment of the overarm.

13. An overarm structure for a milling machine having a guideway formed therein for receiving the overarm, and mechanism associated with said guideway for clamping the overarm, comprising means carried by the overarm for actuating said clamping means including a longitudinal shaft journaled in the end walls of said overarm, a manual actuator secured to one end of the shaft, a differential mechanism mounted in the opposite end of the overarm in operative relation to said shaft, motion transmitting means coupling said mechanism to the clamping mechanism for actuation thereof during all positions of adjustment of the overarm, and additional means carried by the overarm for effecting movement thereof along said guideway including a rotatable pinion journaled in the overarm for engagement with a fixed rack, and means rotatably mounted on said shaft for effecting rotation of the pinion.

In testimony whereof we affix our signatures.

MAX DE HAAS.
BERNARD SASSEN.